United States Patent [19]

Nikaido et al.

[11] Patent Number: 4,558,244

[45] Date of Patent: Dec. 10, 1985

[54] MICRO STEPPING MOTOR

[75] Inventors: Akira Nikaido, Tokyo; Takayasu Machida; Yasuhisa Hirosawa, both of Saitama; Fumio Nakajima, Tokyo, all of Japan

[73] Assignee: Citizen Watch Co., Ltd., Tokyo, Japan

[21] Appl. No.: 588,534

[22] Filed: Mar. 12, 1984

[30] Foreign Application Priority Data

Mar. 11, 1983 [JP] Japan .................................. 58-40472

[51] Int. Cl.$^4$ ........................................... H02K 37/00
[52] U.S. Cl. .................................... 310/49 R; 310/164
[58] Field of Search ........................... 310/49, 162–165, 310/156, 257, 412

[56] References Cited

U.S. PATENT DOCUMENTS

| 2,103,165 | 12/1937 | Merrill ................................ 310/163 |
| 2,103,356 | 12/1937 | Fisher .................................. 310/163 |
| 2,548,633 | 4/1951 | Stephenson ........................ 310/164 |
| 3,878,414 | 4/1975 | Harakawa ....................... 310/164 X |
| 3,989,967 | 11/1976 | Kiknyama ....................... 310/164 X |

Primary Examiner—Donovan F. Duggan
Attorney, Agent, or Firm—Koda and Androlia

[57] ABSTRACT

The present invention provides a micro stepping motor for more accurately stepping and positioning a magnetic head in a magnetic disc system. The stepping motor has a permanent magnet type rotor and a stator encircling the rotor, the rotor having a plurality of pole teeth formed therein with a fine pitch and the stator also having a plurality of pole teeth formed therein with a fine pitch and disposed opposed to the pole teeth in the rotor, the stator pole teeth being divided into at least one pair of pole tooth groups which are out of phase relative to each other by an electrical angle of 180 degrees. A single common stator coil is provided to the pair of stator pole tooth groups. Thus, the stepping pitch of the rotor is determined by the pitch in the pole tooth groups, whereby the rotor can steppingly be driven with higher density even by the reduced number of stator coils. In addition, plural pairs of pole tooth groups can be formed such that at least two pairs of pole tooth groups and the corresponding two stator coils will be provided to determine the stepping angle of the rotor optionally under the multi-excitation.

2 Claims, 4 Drawing Figures

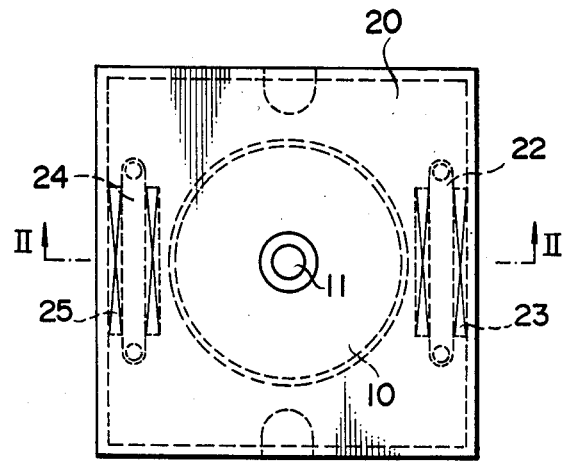
F I G. I
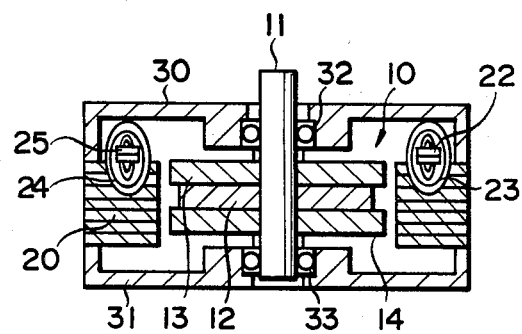
F I G. 2

MICRO STEPPING MOTOR

BACKGROUND OF THE INVENTION

1. Field of the Invention

The present invention relates to a micro stepping motor, and particularly to an improved stepping motor of small size which utilizes a permanent magnet type rotor for positioning a magnetic head in a magnetic recording device.

2. Prior Art

There is well known a magnetic recording device which uses a magnetic disc as a recording medium. Recently, floppy disc has been currently used as such a magnetic disc. Floppy disc includes a flexible substrate and a magnetic layer formed thereon. The magnetic layer can electromagnetically store information of letters, numerals, symbols or figures so that the information will easily be written in and read from the floppy disc. Thus, the floppy disc is very useful as an external memory for various computers.

As well known, the magnetic disc is rotated on a spindle at a constant speed with tracks on the storing faces of the rotating floppy disc being adapted to store the desired information in a predetermined format. To write and read the information, a magnetic head is provided which is substantially radially movable relative to the magnetic disc. Thus, accuracy in positioning the magnetic head will directly influence the characteristics of storage in the system. If the accuracy is lower, Write/Read will not be carried out for a predetermined track in a proper format. Also, if there is any offset between the track and the magnetic head, that is, "off track", a serious malfunction will be produced.

Therefore, a stepping motor has been used to position the magnetic head with high accuracy. However, the stepping motor requires a complicated and relatively bulky structure which prevents the magnetic storage from being small-sized, as well known in the art.

Since floppy disc drives of smaller size and thickness have been utilized as magnetic storages in recent years, severe requirements of reduced size and improved accuracy are being made also relative to the stepping motor for positioning the magnetic head.

SUMMARY OF THE INVENTION

It is therefore an object of the present invention to provide an improved stepping motor which can position a magnetic head with higher accuracy and can be reduced in size and thickness.

Another particular object of the present invention is to provide an improved stator structure which can be used in a stepping motor utilizing a permanent magnet type rotor.

In order to accomplish the above objects, the present invention provides a micro stepping motor comprising a permanent magnet type rotor having a plurality of rotor pole teeth formed therein at the outer periphery, and a stator having a plurality of stator pole teeth which are formed therein to encircle said rotor, said stator pole teeth being divided into a plurality of pole tooth groups out of phase from each other, said stator including at least one stator core fixed thereto around which a stator coil is wound, whereby a stator magnetic circuit is defined by said stator core and at least one pair of stator pole tooth groups to supply drive currents having different polarities to said one stator coil in sequence so that the rotor will steppingly be driven.

BRIEF DESCRIPTION OF THE DRAWINGS

FIG. 1 is a front view of a preferred embodiment of a micro stepping motor according to the present invention;

FIG. 2 is a cross-sectional view taken along a line II—II in FIG. 1;

DETAILED DESCRIPTION OF THE INVENTION

Figure 3:
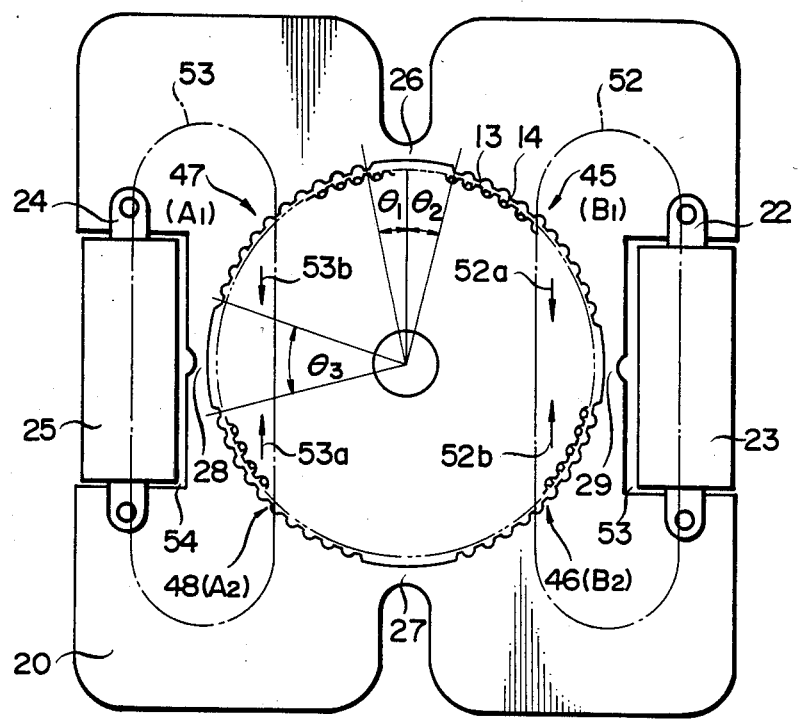
FIG. 3 is an enlarged plan view showing the relationship between the rotor and stator with the housing shown in FIG. 1 being removed for clarification.
Figure 4:
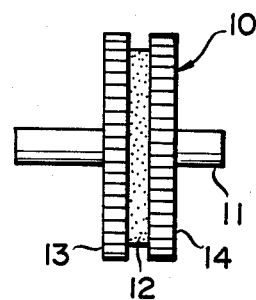
FIG. 4 is a side elevational view of the rotor used in the present embodiment.

Referring now to the drawings, there is shown a micro stepping motor according to the present invention which comprises a permanent magnet type rotor 10 and a stator 20 spaced away from the outer periphery of the rotor 10 by a predetermined distance. The rotor 10 includes a shaft 11 journalled at the opposite ends by two housings 30 and 31 through bearings 32 and 33.

The rotor 10 also includes a disc-shaped permanent magnet 12 magnetized in its axial direction and rotor plates 13 and 14 each fixed to the permanent magnet 12 at each side. These rotor plates are made of a magnetic material. Each of the rotor plates 13 and 14 includes a plurality of rotor pole teeth indexed around the outer periphery thereof. The corresponding pole teeth of the rotor plates 13 and 14 are out of phase by 180 degrees in electrical angle.

The stator 20 is constructed by a lamination of sheets made of a magnetic material. This lamination is interposed and fixed between the housings 30 and 31. The inner periphery of the stator 20 includes a plurality of stator pole teeth formed thereon which are spaced away from the rotor pole teeth of the rotor 10 by a predetermined distance. The pole teeth will be described further hereinafter.

One feature of the present invention is that the stator 20 includes at least one common stator coil and at least one common stator core which are used to supply a magnetic flux to all the stator pole teeth, rather than a stator coil for each pole tooth of the stator. In the illustrated embodiment, two stator cores 22 and 25 are fixed to the stator 20 by means of screws, each of stator cores having an exciting coil 23 or 24 wound therearound.

As shown in detail in FIG. 3, the stator 20 of the illustrated embodiment is basically divided into four magnetically independent sections by four narrow magnetic paths 26, 27, 28 and 29 angularly spaced away from one another by an equal distance such that two magnetic paths 52 and 53 will be formed in the stator 20. In spite of the magnetic independency, each of the stator sections is mechanically connected with any adjacent stator section by the respective narrow magnetic path 26, 27, 28 or 29. Therefore, the respective stator plates can simply be formed by any machining means such as pressing or others through a single step. Furthermore, the stator pole teeth can precisely be formed in the inner periphery of the stator plates.

The stator pole teeth on the stator 20 are divided into four pole tooth groups 45, 46, 47 and 48 corresponding to the respective magnetic paths 52 and 53, as shown in FIG. 3. Two stator pole tooth groups 45 and 46 form a phase B while the remaining stator pole tooth groups 47 and 48 form another phase A. The stator pole tooth group 47 (A1) is out of phase relative to the stator pole tooth group 48 (A2) by an electrical angle of 180°. Similarly, the stator pole tooth group 45 (B1) is out of phase relative to the stator pole tooth group 46 (B2) by the same electrical angle. As is well known in the art, the stator pole teeth in each group are located and arranged with one magnetic pole pitch.

In the illustrated embodiment, if the number of the rotor pole teeth is equal to 60, one magnetic pole pitch is defined by a spatial angle; 360 degrees/60=60 degrees.

As seen from FIG. 3, further, the respective stator pole tooth group 47 or 48 in the phase A is out of phase relative to the corresponding stator pole tooth group 45 or 46 by an electrical angle of 90°. In a preferred embodiment, angles $\theta_1$ and $\theta_2$ are defined respectively by:

6 degrees×n−1.5 degrees, and 6 degrees×n+1.5 degrees where n is a positive integer. Further, a difference of phase $\theta_3$ between the pole tooth groups in the same phase is defined by:

6 degrees×n+3 degrees.

It is thus understood that the corresponding pole teeth in the phases A and B are spaced away from each other by the electrical angle of 90 degrees (that is, by the mechanical angle of 1.5 degrees).

In the illustrated embodiment, a single exciting coil is provided for each of the magnetic paths 52 and 53. For this purpose, the stator 20 includes two notches 53 and 54 formed therein at opposite sides. Each of the nothces 53 and 54 receives a stator core 22 or 25 around which an exciting coil 23 or 24 is wound. The stator cores 22 and 25 are fixed to the stator 20 by means of screws.

The stepping motor constructed according to the illustrated embodiment of the present invention will be operated as follows:

Excitation is provided to the magnetic paths 52 and 53 such that magnetic fluxes are alternately formed in the opposite directions. In fact, the orientations of these magnetic fluxes varies in sequence as shown by arrows 53a, 52a, 53b and 52b in FIG. 3. Such multi-excitation can be accomplished by intermittently inverting exciting currents to the exciting coils 23 and 24 in a predetermined phase. Thus, the rotor 10 can be rotated at a time by one-fourth of one magnetic pole pitch, that is, 1.5 degrees. The rotational direction of the rotor 10 can be reversed by providing exciting currents to the exciting coils 22 and 25 in the reverse order.

It is thus apparent that the pitch in the rotation of the rotor 10 will be determined by the pitch in the pole teeth on the rotor 10 and stator 20. The rotor can steppingly be driven with very high accuracy only by the use of two exciting coils for the stator 20. Consequently, the present invention provides a stepping motor having its very simplified structure.

As described hereinbefore in connection with FIG. 3, the rotor 10 includes the permanent magnet 12 magnetized in its axial direction and the rotor plates 13 and 14 mounted thereon at the opposite ends and which include their pole teeth formed therein with one of the pole teeth being located relative to the corresponding pole tooth by the electrical angle 180°. Upon the above multi-excitation, thus, each of the magnetic paths is formed as follows:

The magnetic path 53a is formed by the stator pole tooth group 48, upper rotor plate 13, permanent magnet 12, lower rotor plate 14 and rotor pole tooth group 47 while the magnetic path 52a is formed by the stator pole tooth group 45, upper rotor plate 13, permanent magnet 12, lower rotor plate 14 and stator pole tooth group 46. Similarly, the magnetic path 53b is formed by the stator pole tooth group 47, upper rotor plate 13, permanent magnet 12, lower rotor plate 14 and stator pole tooth group 48 while the magnetic path 52b is formed by the stator pole tooth group 46, upper rotor plate 13, permanent magnet 12, lower rotor plate 14 and stator pole tooth group 45.

The previous embodiment has been described as to a number of stator plates divided plane-wise to form two sets of magnetic paths 52 and 53. In accordance with the present invention, furthermore, narrow magnetic paths 26, 27, 28 and 29 are provided between the magnetic paths 52 and 53 and between the opposite poles of the exciting coils to provide a mechanically integral stator plate structure which is also magnetically dividable.

As will be apparent from the foregoing, the present invention provides a stepping motor which can be constituted of the exciting coils and stator cores which are reduced in number in comparison with the prior art. In addition, the stepping pitch of the rotor can be more finely set since the stator pole teeth are formed with finer pitch. If the stator is made of a single flat plate, the stator pole teeth can be machined with higher accuracy by any suitable means such as pressing or etching. Thus, error can remarkably be reduced upon stepping of the rotor. The stepping motor according to the present invention can very preferably be used in magnetic storage which utilizes a magnetic disc having densed tracks for high-dense memory.

Additionally, the present invention enables the magnetic storage to be small-sized, light-weight and inexpensive since it provides a simplified stator structure.

In accordance with the present invention, the number of poles in the rotor can be changed optionally. It is also preferred that the stator core is made of a magnetic material having higher magnetic flux density and that the stator plates are made of a material having higher magnetic permeability.

We claim:

1. A micro stepping motor comprising a housing, a rotor shaft rotatably coupled to said housing, a disc-like permanent magnet magnetized in its axial direction rotor provided on said rotor shaft and having a plurality of rotor pole teeth formed therein at the outer periphery, a pair of rotor pole plates made of a magnetic material and fixed thereto at the opposite axial ends thereof, each of the rotor pole teeth in one of the rotor pole plates being out of phase relative to the corresponding rotor pole teeth in the other rotor pole plate at an electrical angle of 180 degrees, and a stator fixed to said housing having a plurality of stator pole teeth disposed around the outer periphery of said rotor, said stator pole teeth being divided into two pairs of stator pole tooth groups with one of the pairs being out of phase relative to the adjacent stator pole tooth groups by an electrical angle of 90 degrees, each of said two pairs including pole teeth out of phase relative to one another by an electrical angle of 180 degrees, said stator including at least one stator core formed therein around which a stator coil is wound provided to each of the stator pole teeth groups, each of the stator coils being subjected to supply of exciting currents in different phases, said stator core and at least one pair of said stator pole tooth groups defining a stator magnetic circuit supplying driving currents having different polarities to said one stator coil to steppingly drive said rotor.

2. A micro stepping motor as defined in claim 1, wherein said stator is in the form of a single plate (S) including narrow magnetic paths formed therein between each adjacent stator pole tooth groups, and wherein the magnetic flux in each of said stator coils is inducted to the corresponding pair of stator pole tooth groups.

* * * * *